US012598453B2

(12) United States Patent
Arends et al.

(10) Patent No.: US 12,598,453 B2
(45) Date of Patent: Apr. 7, 2026

(54) INTERNATIONAL INTERNET PROTOCOL MULTIMEDIA SUBSYSTEM (IMS) CALL NETWORK AUTHORIZATION

(71) Applicant: T-Mobile Innovations LLC, Overland Park, KS (US)

(72) Inventors: Joel L. Arends, Renton, WA (US); Saqib Badar, Bellevue, WA (US); Nassereddine Sabeur, Bellevue, WA (US)

(73) Assignee: T-Mobile Innovations LLC

( * ) Notice: Subject to any disclaimer, the term of this patent is extended or adjusted under 35 U.S.C. 154(b) by 307 days.

(21) Appl. No.: 18/540,617

(22) Filed: Dec. 14, 2023

(65) Prior Publication Data

US 2025/0203339 A1     Jun. 19, 2025

(51) Int. Cl.
| | |
|---|---|
| *H04W 8/04* | (2009.01) |
| *H04W 12/08* | (2021.01) |
| *H04W 12/63* | (2021.01) |
| *H04W 80/04* | (2009.01) |

(52) U.S. Cl.
CPC ............. *H04W 8/04* (2013.01); *H04W 12/08* (2013.01); *H04W 12/63* (2021.01); *H04W 80/04* (2013.01)

(58) Field of Classification Search
CPC ....... H04W 8/04; H04W 12/63; H04W 12/08; H04W 80/04
See application file for complete search history.

(56) References Cited

U.S. PATENT DOCUMENTS

| | | | |
|---|---|---|---|
| 2009/0303942 A1* | 12/2009 | Camilleri .............. | H04W 4/029 455/445 |
| 2011/0294472 A1* | 12/2011 | Bramwell ............... | H04W 8/04 455/445 |
| 2018/0220291 A1* | 8/2018 | Fares .................. | H04W 12/082 |

FOREIGN PATENT DOCUMENTS

| | | | | |
|---|---|---|---|---|
| WO | WO-2006118495 A1 * | 11/2006 | .............. | H04W 8/10 |
| WO | WO-2016155827 A1 * | 10/2016 | ......... | H04L 65/1073 |

* cited by examiner

*Primary Examiner* — Vivek Srivastava

(57) ABSTRACT

A method of authorizing an IMS call in a foreign country for a wireless communication device that has a wireless communication subscription service with a US wireless communication service provider. The method comprises receiving a request to originate an IMS call by a HSS located in the US, wherein the request is received from a first wireless communication device located outside of the US and the request identifies a first country; determining by the HSS that international IMS roaming service is allowed by the wireless communication service provider in the first country; determining by the HSS that a first wireless communication subscription service associated with the first wireless communication device allows international IMS roaming service; and sending an authorization to originate the IMS call by the HSS to the first wireless communication device, whereby the first wireless communication device is enabled to originate the IMS call in the first country.

20 Claims, 6 Drawing Sheets

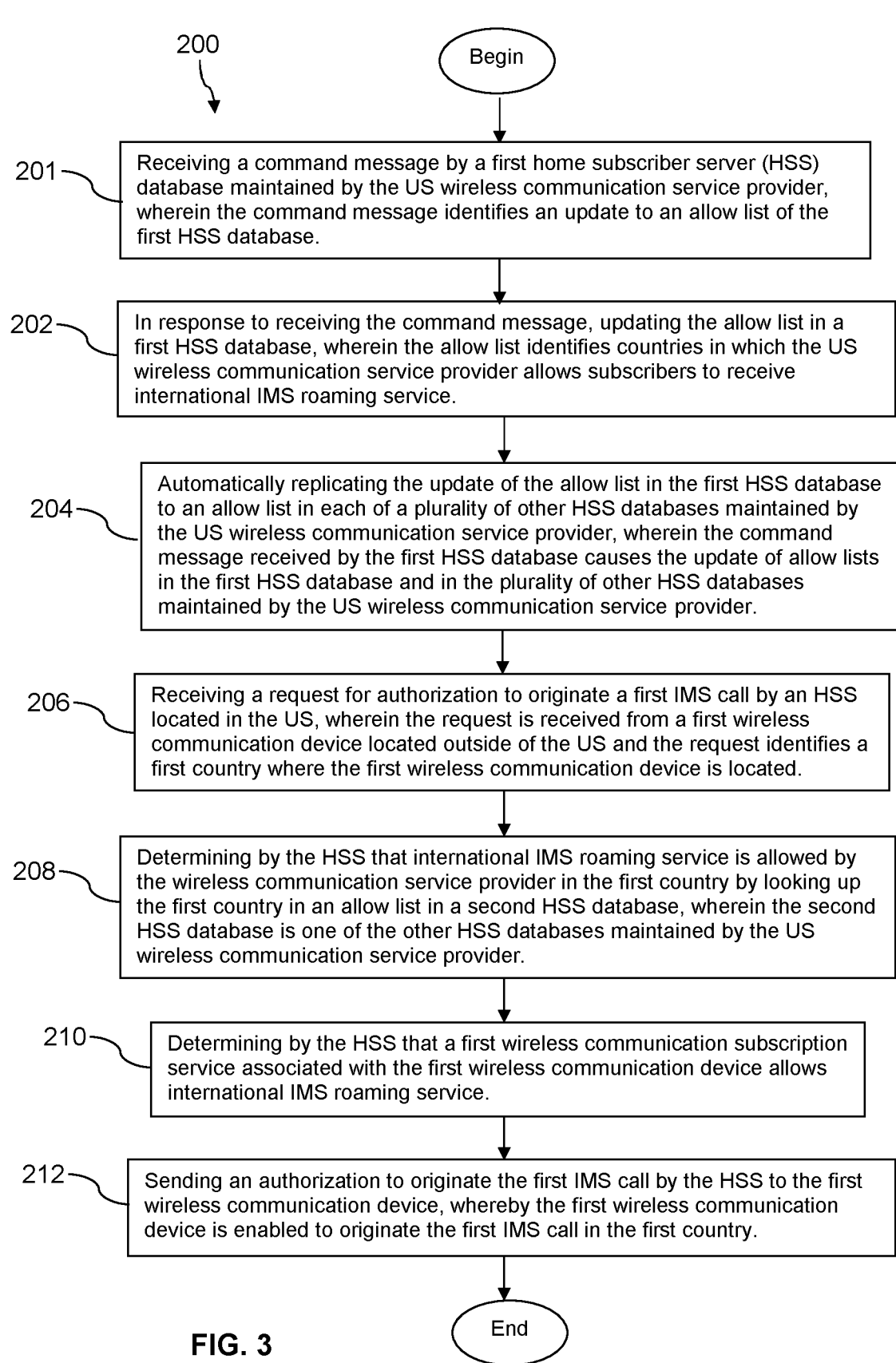

200

Begin

201 — Receiving a command message by a first home subscriber server (HSS) database maintained by the US wireless communication service provider, wherein the command message identifies an update to an allow list of the first HSS database.

202 — In response to receiving the command message, updating the allow list in a first HSS database, wherein the allow list identifies countries in which the US wireless communication service provider allows subscribers to receive international IMS roaming service.

204 — Automatically replicating the update of the allow list in the first HSS database to an allow list in each of a plurality of other HSS databases maintained by the US wireless communication service provider, wherein the command message received by the first HSS database causes the update of allow lists in the first HSS database and in the plurality of other HSS databases maintained by the US wireless communication service provider.

206 — Receiving a request for authorization to originate a first IMS call by an HSS located in the US, wherein the request is received from a first wireless communication device located outside of the US and the request identifies a first country where the first wireless communication device is located.

208 — Determining by the HSS that international IMS roaming service is allowed by the wireless communication service provider in the first country by looking up the first country in an allow list in a second HSS database, wherein the second HSS database is one of the other HSS databases maintained by the US wireless communication service provider.

210 — Determining by the HSS that a first wireless communication subscription service associated with the first wireless communication device allows international IMS roaming service.

212 — Sending an authorization to originate the first IMS call by the HSS to the first wireless communication device, whereby the first wireless communication device is enabled to originate the first IMS call in the first country.

End

FIG. 3

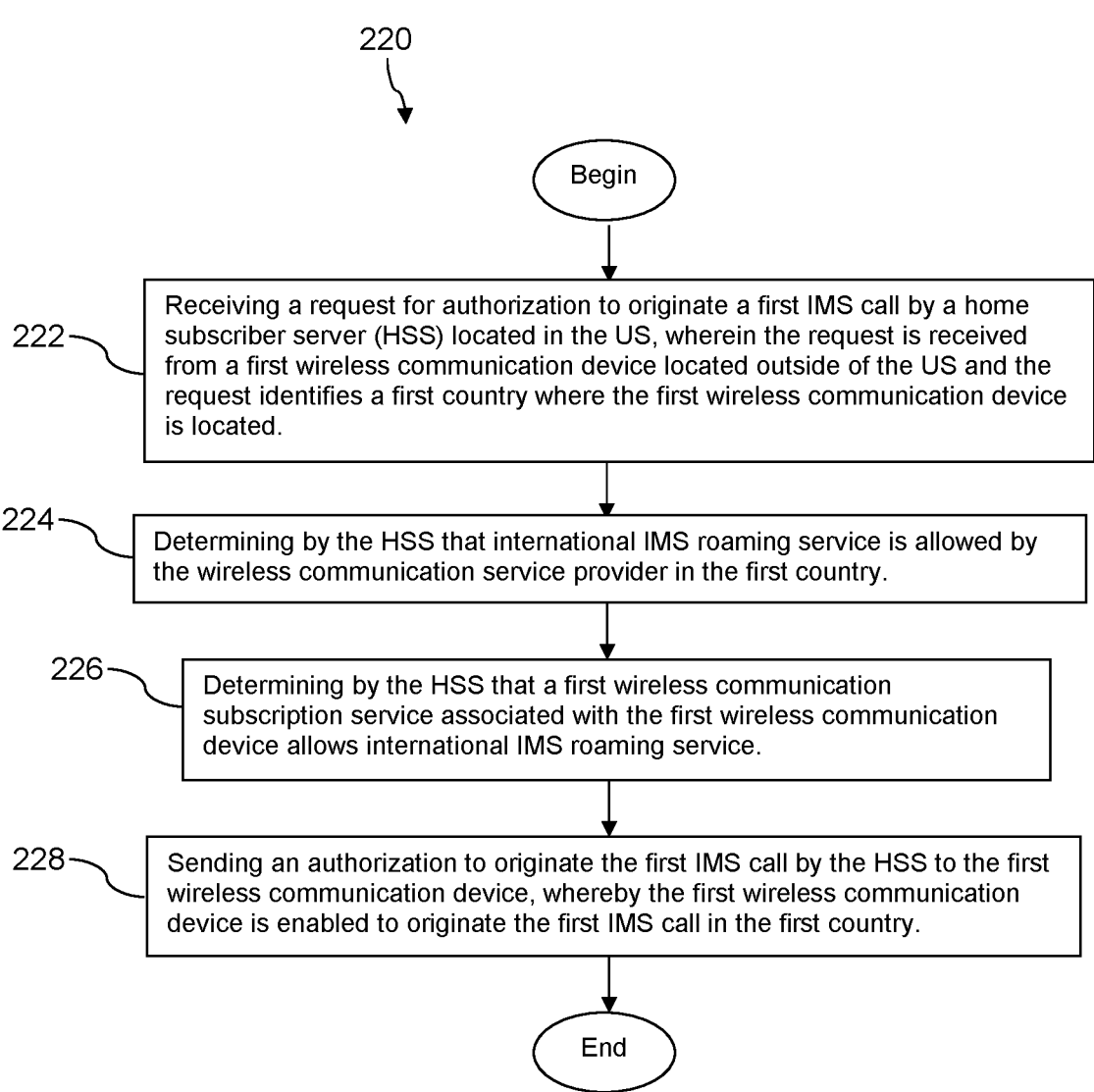

220

Begin

222 — Receiving a request for authorization to originate a first IMS call by a home subscriber server (HSS) located in the US, wherein the request is received from a first wireless communication device located outside of the US and the request identifies a first country where the first wireless communication device is located.

224 — Determining by the HSS that international IMS roaming service is allowed by the wireless communication service provider in the first country.

226 — Determining by the HSS that a first wireless communication subscription service associated with the first wireless communication device allows international IMS roaming service.

228 — Sending an authorization to originate the first IMS call by the HSS to the first wireless communication device, whereby the first wireless communication device is enabled to originate the first IMS call in the first country.

End

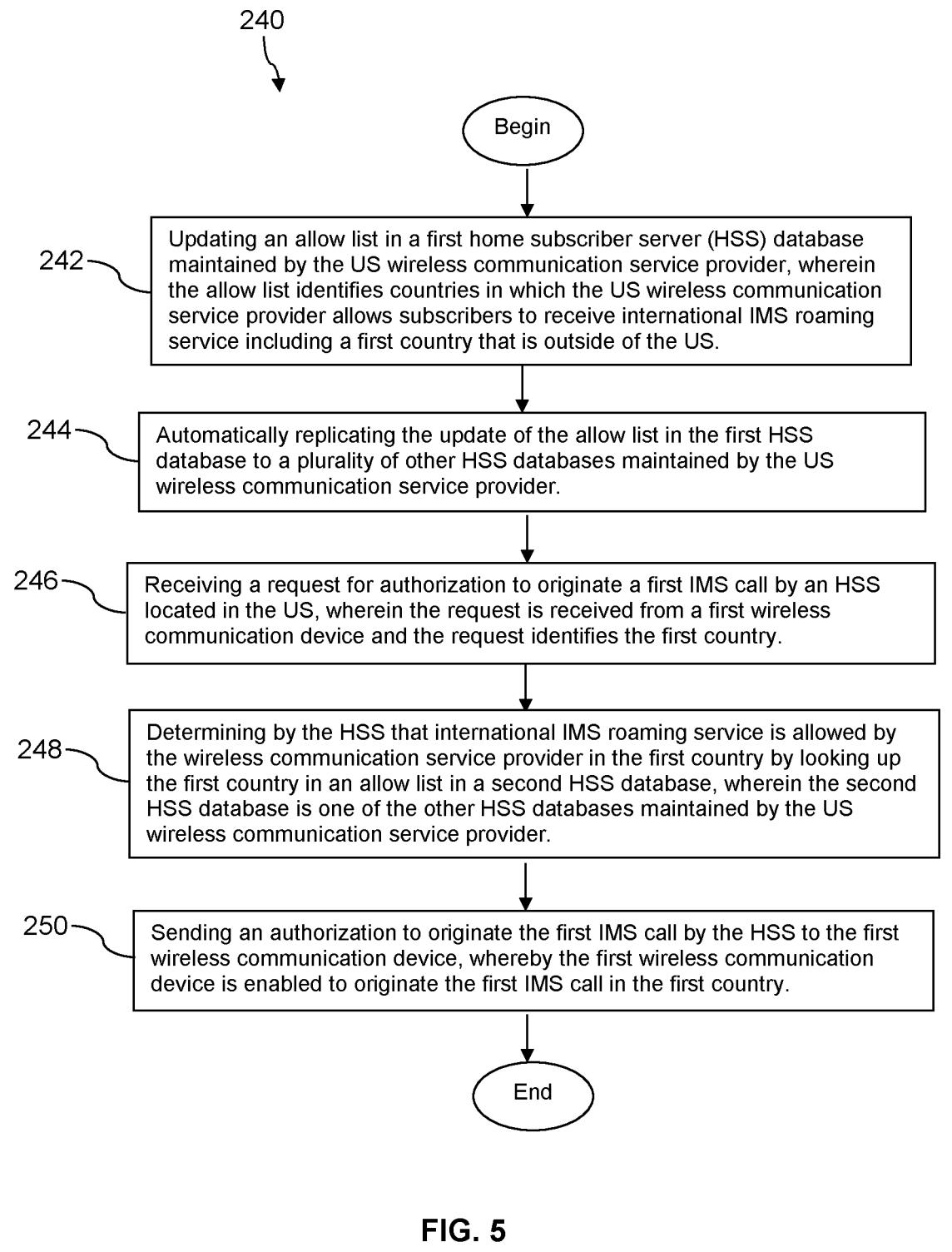

Begin

242 — Updating an allow list in a first home subscriber server (HSS) database maintained by the US wireless communication service provider, wherein the allow list identifies countries in which the US wireless communication service provider allows subscribers to receive international IMS roaming service including a first country that is outside of the US.

244 — Automatically replicating the update of the allow list in the first HSS database to a plurality of other HSS databases maintained by the US wireless communication service provider.

246 — Receiving a request for authorization to originate a first IMS call by an HSS located in the US, wherein the request is received from a first wireless communication device and the request identifies the first country.

248 — Determining by the HSS that international IMS roaming service is allowed by the wireless communication service provider in the first country by looking up the first country in an allow list in a second HSS database, wherein the second HSS database is one of the other HSS databases maintained by the US wireless communication service provider.

250 — Sending an authorization to originate the first IMS call by the HSS to the first wireless communication device, whereby the first wireless communication device is enabled to originate the first IMS call in the first country.

End

FIG. 5

INTERNATIONAL INTERNET PROTOCOL MULTIMEDIA SUBSYSTEM (IMS) CALL NETWORK AUTHORIZATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communication service for individuals has become nearly ubiquitous. Subscribers to wireless communication services can use their wireless communication device to communicate while in the home network of their wireless communication service provider and often while roaming on a network not provided by their own wireless communication service provider. Such roaming service may be provided based on agreements between different wireless communication service providers to mutually provide roaming service to the other provider's subscribers.

SUMMARY

In an embodiment, a method of authorizing an IP multimedia system (IMS) call in a foreign country for a wireless communication device that has a wireless communication subscription service with a United States (US) wireless communication service provider is disclosed. The method comprises receiving a command message by a first home subscriber server (HSS) database maintained by the US wireless communication service provider, wherein the command message identifies an update to an allow list of the first HSS database; in response to receiving the command message, updating the allow list in a first HSS database, wherein the allow list identifies countries in which the US wireless communication service provider allows subscribers to receive international IMS roaming service; and automatically replicating the update of the allow list in the first HSS database to an allow list in each of a plurality of other HSS databases maintained by the US wireless communication service provider, wherein the command message received by the first HSS database causes the update of allow lists in the first HSS database and in the plurality of other HSS databases maintained by the US wireless communication service provider. The method further comprises receiving a request for authorization to originate a first IMS call by an HSS located in the US, wherein the request is received from a first wireless communication device located outside of the US and the request identifies a first country where the first wireless communication device is located and determining by the HSS that IMS service is allowed by the wireless communication service provider in the first country by looking up the first country in an allow list in a second HSS database, wherein the second HSS database is one of the other HSS databases maintained by the US wireless communication service provider. The method further comprises determining by the HSS that a first wireless communication subscription service associated with the first wireless communication device allows international IMS roaming service and sending an authorization to originate the first IMS call by the HSS to the first wireless communication device, whereby the first wireless communication device is enabled to originate the first IMS call in the first country.

In another embodiment, a method of authorizing an IP multimedia system (IMS) call in a foreign country for a wireless communication device that has a wireless communication subscription service with a United States (US) wireless communication service provider is disclosed. The method comprises receiving a request for authorization to originate a first IMS call by a home subscriber server (HSS) located in the US, wherein the request is received from a first wireless communication device located outside of the US and the request identifies a first country where the first wireless communication device is located; determining by the HSS that international IMS roaming service is allowed by the wireless communication service provider in the first country; determining by the HSS that a first wireless communication subscription service associated with the first wireless communication device allows international IMS roaming service; and sending an authorization to originate the first IMS call by the HSS to the first wireless communication device, whereby the first wireless communication device is enabled to originate the first IMS call in the first country.

In yet another embodiment, a method of authorizing an IP multimedia system (IMS) call in a foreign country for a wireless communication device that has a wireless communication subscription service with a United States (US) wireless communication service provider is disclosed. The method comprises updating an allow list in a first home subscriber server (HSS) database maintained by the US wireless communication service provider, wherein the allow list identifies countries in which the US wireless communication service provider allows subscribers to receive international IMS roaming service including a first country that is outside of the US and automatically replicating the update of the allow list in the first HSS database to a plurality of other HSS databases maintained by the US wireless communication service provider. The method further comprises receiving a request for authorization to originate a first IMS call by an HSS located in the US, wherein the request is received from a first wireless communication device and the request identifies the first country; determining by the HSS that international IMS roaming service is allowed by the wireless communication service provider in the first country by looking up the first country in an allow list in a second HSS database, wherein the second HSS database is one of the other HSS databases maintained by the US wireless communication service provider; and sending an authorization to originate the first IMS call by the HSS to the first wireless communication device, whereby the first wireless communication device is enabled to originate the first IMS call in the first country.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 3 is a flow chart of a method according to an embodiment of the disclosure.

FIG. 4 is a flow chart of another method according to an embodiment of the disclosure.

FIG. 5 is a flow chart of yet another method according to an embodiment of the disclosure.

DETAILED DESCRIPTION

Figure 1:
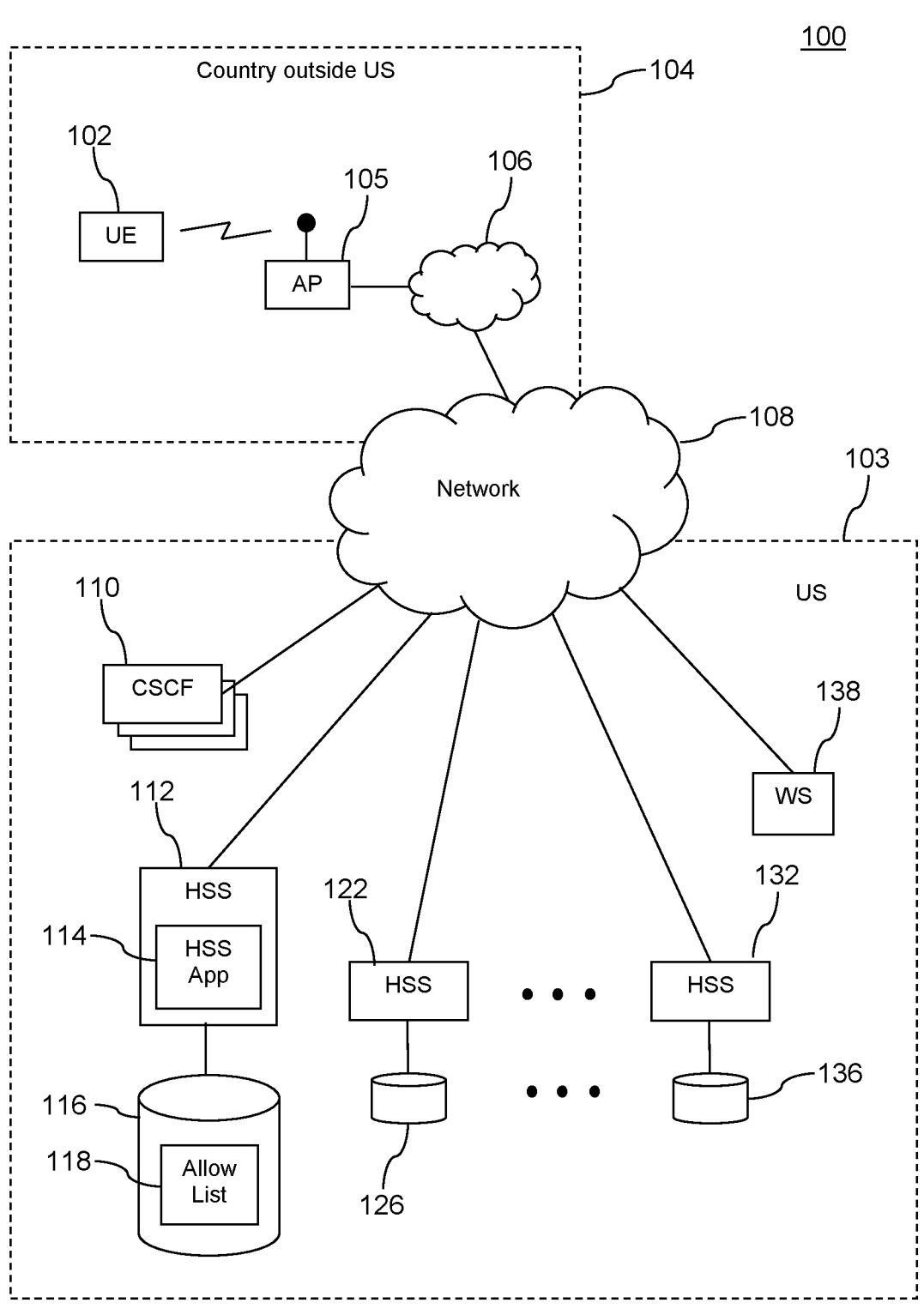
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Subscribers for wireless communication services may be able to receive wireless communication service while located in a foreign country. For example, if IMS registration of a user wireless device is allowed in the given foreign country, the wireless device may be able to complete an IMS call via a WiFi access point (AP) located in the foreign country, where the WiFi AP may connect the wireless device to a communication network in the foreign country to complete the IMS call. In some home networks (e.g., a network located in the United States and operated by the wireless communication service provider with which the user has a wireless communication service subscription account), the registration of the IMS call may be allowed any time that the home service provider supports (e.g., accepts or otherwise permits as a general proposition) international IMS roaming in the subject foreign country. But this simple condition does not discriminate between subscribers who have a service plan that permits such International IMS roaming and other subscribers who have a service plan that does not permit International IMS roaming. Thus, under that system, subscribers who do not have a service plan that permits International IMS roaming may add congestion to the network of the foreign country and/or to the home network located in the United States, thereby interfering with providing high quality service by the network in the foreign country and/or by the home network located in the United States.

In an embodiment, a call session control function (CSCF) or a proxy-CSCF (P-CSCF) may examine a P-Access Network Information (PANI) header in the IMS registration message sent by the user's wireless communication device to determine a country in which the IMS registration message originates. The P-CSCF may try to look up the country in a local list of countries in which the subject home service provider allows International IMS roaming. If the country is listed, the P-CSCF may then send an IMS allow message to the user wireless communication device, whereby the device is enabled to engage in International IMS roaming in the foreign country. This simple conditional has the disadvantage identified above, but further, updating the local list of countries in each of a plurality of P-CSCFs operated by a wireless communication service provider may be a cumbersome, repetitive task, conducted manually by craftspersons, and subject to human error.

The present disclosure teaches a new method of qualifying user requests to engage in an IMS call while located in a foreign country that overcomes both of the disadvantages described above of a current method for qualifying user international IMS roaming requests. In an embodiment, the user wireless communication device sends an IMS registration message to a WiFi AP located in a foreign country; the WiFi AP forwards this IMS registration message to a CSCF located in the subscriber's wireless communication service provider's network located in the home country. The CSCF forwards this IMS registration message to a home subscriber server (HSS) located in the subscriber's wireless communication service provider's network located in the home country. In response to receiving the IMS registration message, which identifies the foreign country and the user, the HSS first consults a list of foreign countries that the wireless communication service provider has approved for International IMS roaming. The list of countries may be maintained in an HSS data store or HSS database. If the subject foreign country is not listed, the HSS returns an IMS registration denied message to the CSCF; the CSCF returns the IMS registration denied message via the WiFi AP to the user's wireless communication device. In an embodiment, a reason is presented on a user interface of the user's wireless communication device, for example "International IMS roaming not allowed in this country."

If, however, as a general proposition, the wireless communication service provider supports international IMS roaming in the subject country, the HSS then does a further check based on the specific subscriber to determine if that subscriber has a wireless service plan that allows international IMS roaming. If the subscriber's service plan does not allow International IMS roaming, again the HSS returns an IMS registration denied message to the user's wireless communication device. If, however, the subscriber's service plan does allow International IMS roaming, the HSS returns an IMS registration allowed message to the user's wireless communication device. The user's wireless communication device is then able to proceed with establishing an IMS communication link with the WiFi AP in the foreign country and complete IMS calls.

The wireless communication service provider network may provide a systemic feature whereby a wireless communication service provider craftsperson can complete a single command that adds a specific foreign country or a plurality of specific foreign countries to the list of allowed countries in all of the HSS data stores of all the HSSs operated by the wireless communication service provider. Likewise, the wireless communication service provider network may provide another systemic feature whereby the craftsperson can complete a single command that deletes a specific foreign country or a plurality of specific foreign countries from the list of allowed countries in all of the HSS data stores of all the HSSs operated by the wireless communication service provider. Note that completing an update of these types across a plurality of HSS data stores by executing a single command is much more convenient, more efficient, and less prone to error (fewer opportunities for error) than the approach of updating lists at a plurality of CSCFs one at a time. This update of a plurality of HSS data stores with a single command may be enabled by the HSSs and HSS data stores having a centralized node architecture.

The system and method disclosed herein provides a particular technical solution to a specific technical problem rooted in the computer technology used to implement a modern wireless communication system. This system can support a fairer distribution of the costs of International IMS roaming among subscribers who have paid for a plan that supports International IMS roaming.

Turning now to FIG. 1, a system 100 is described. In an embodiment, the system 100 comprises a user equipment (UE) 102 that receives a wireless communication link from a WiFi access point (AP) 105 that couples the UE 102 to a communication network 106. The UE 102 may be a mobile phone, a smart phone, a laptop computer, a tablet computer, or a notebook computer. The UE 102, the WiFi AP 105, and the network 106 may be located in a foreign country 104. The UE 102 may be subscribed to receive wireless communication service from a wireless communication service provider that operates a wireless communication network inside the United States (US) 103. The wireless communication network may form part of a communication network 108 that comprises other network infrastructure of other wireless communication service providers, other wired communication service providers, and the Internet. The network 108 comprises one or more public networks, one or more private networks, or a combination thereof. The network 108 may be located partially in the US and partially in other countries, as suggested by the network 108 in FIG. 1 illustrated as straddling the dotted line box associated with the US 103 and the dotted line box associated with the foreign country 104.

The service provider may maintain and operate a plurality of CSCFs 110 and a plurality of HSSs associated with HSS data stores. For example, the service provider may operate a first HSS 112 that executes an HSS application 114 and is coupled to a first HSS data store 116 having an allow list 118, a second HSS 122 coupled to a second HSS data store 126, and a third HSS 132 coupled to a third HSS data store 136. It is understood that the system 100 may comprise any number of HSSs and HSS data stores. It is understood that the HSSs 122, 132 execute their own instances of the HSS application 114. It is understood that the HSS data stores 126, 136 store their own copies of the allow list 118. In an embodiment, the CSCF 110 may comprise independent functions or nodes that provide the aggregate CSCF function. For example, the CSCF 110 may comprise a proxy-CSCF (P-CSCF), an interrogating-CSCF (I-CSCF), a serving-CSCF (S-CSCF), and possibly other nodes or functions.

It is understood that the CSCF 110, the HSSs 112, 122, 132, and HSS data stores 116, 126, 136 may be considered to be part of the network 108 but are illustrated separately in FIG. 1 to promote clarity of description. The CSCFs 110, the HSSs 112, 122, 132, and the HSS data stores 116, 126, 136 may be implemented, at least in part, as computer systems. Computer systems are described further hereinafter. Because the HSS 114, 122, 132 and the HSS data store 116, 126, 136 have a centralized node architecture, the allowed list 118 is easily updated, for example by a craftsperson executing a single command on a workstation 138 to update the allowed lists 118 in all of the HSS data stores 116, 126, 136.

Figure 2:
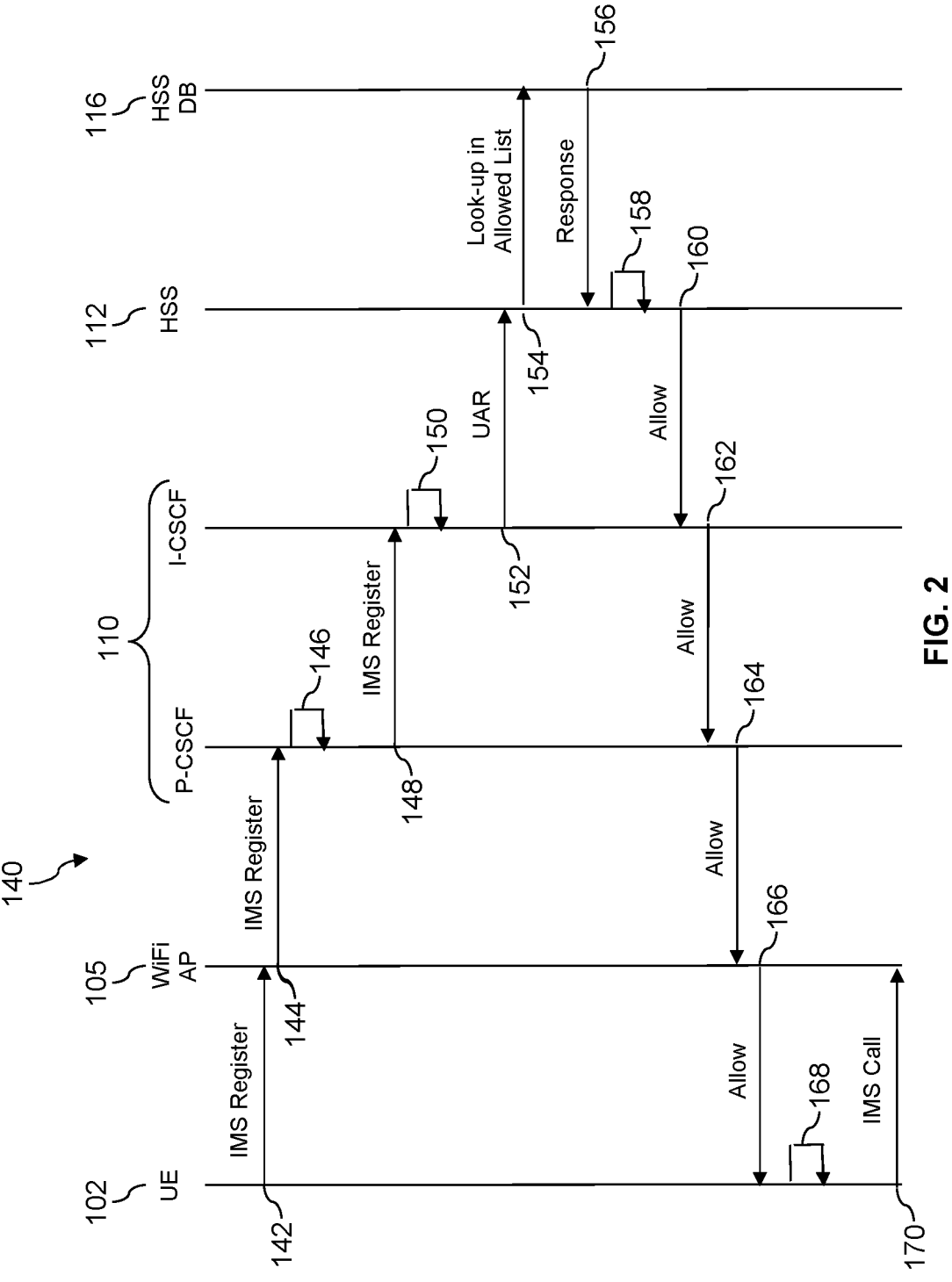
FIG. 2 is a message sequence diagram according to an embodiment of the disclosure.

Turning now to FIG. 2, a message sequence 140 according to an embodiment of the disclosure is described. It is noted that some of the messages in the message sequence 140 may be session initiation protocol (SIP) messages and others of the messages may be diameter protocol messages. Alternatively, different types of messages may be exchanged among the communication nodes that correspond roughly to the messages identified herein. The message sequence 140 represents a sequence of messages that may occur in response to the UE 102 initiating an IMS call. Typically, the UE 102 initiates an IMS call by conducting an IMS registration procedure. If the result of the IMS registration procedure is an allow message being received by the UE 102 (e.g., a SIP 200 OK message), the UE 102 is authorized to proceed with originating the IMS call. If, however, the IMS registration is denied (the registration request is rejected, e.g., a SIP 403 message is received by the UE 102), the UE 102 refrains from originating the IMS call. Said in other words, an IMS application executing on the UE 102 has the functionality of originating an IMS call but is configured to do so ONLY when it has successfully completed an IMS registration procedure. An IMS call may be a voice call, a text message, or a video call. As the IMS protocol and as technology advances, other IMS call types may be supported by IMS, and it is understood that this IMS registration procedure disclosed herein would provide advantages and benefits for those new IMS call types as well.

At label 142, the UE 102 sends an IMS registration message to the WiFi AP 105. The IMS registration message sent by the UE 102 includes a country code (a code associated to the foreign country 104) in a PANI of the IMS registration message. At label 105, the WiFi AP 105 forwards the IMS registration message to a CSCF 110, for example to a P-CSCF in the wireless communication service provider's network in the US 103. At label 146, the P-CSCF maps the country code in the PANI of the IMS registration message to a mobile country code and mobile network code (MCCMNC) and puts the MCCMNC in a P-visited network ID (PVNI) header of the IMS registration message. At label 148, the P-CSCF forwards the IMS registration message to an I-CSCF. At label 150, the I-CSCF builds a user authorization request (UAR) that includes the MCCMNC in a visited network attribute value pair (AVP). At label 152, the I-CSCF sends the UAR message to the HSS 112.

At label 154, the HSS 112 (or the HSS application 114) looks up the MCCMNC in the allowed list 118 stored in the HSS data store 116. If the MCCMNC is not in the allowed list 118, the HSS 112 returns a user authentication answer (UAA) indicating that international IMS roaming is not allowed. In an embodiment, this may be a UAA 5004 message. The I-CSCF converts this UAA to a SIP 403 message (e.g., a request denial response) and sends the SIP 403 message to the P-CSCF; the P-CSCF sends the SIP 403 message to the WiFi AP 105; and the WiFi AP 105 sends the SIP 403 message to the UE 102. The UE 102 responds to the SIP 403 message by not attempting to originate the IMS call.

If the MCCMNC is in the allowed list 118, at label 158 the HSS 112 (or the HSS application 114) further checks whether a subscription plan associated with the UE 102 supports international IMS roaming. If the subscription plan associated with the UE 102 does not support international IMS roaming, the HSS 112 (or the HSS application 114) returns a UAA indicating international IMS roaming is not allowed, and the I-CSCF converts this UAA to a SIP 403 message that it returns to the P-CSCF, the P-CSCF returns the SIP 403 message to the WiFi AP 105, and the WiFi AP 105 returns the SIP 403 message to the UE 102.

If the MCCMNC is listed in the allowed list 118 and if the subscription plan associated with the UE supports international IMS roaming, the HSS 112 (or HSS application 114) returns a UAA 2001 message (e.g., an allow message) to the I-CSCF at label 160. The I-CSCF converts the UAA 2001 message to a SIP 200 OK message (e.g., an allow message) and sends the SIP 200 OK message at label 162 to the P-CSCF. The P-CSCF at label 164 sends the SIP 200 OK message to the WiFi AP 105. The WiFi AP 105 at label 166 sends the SIP 200 OK message to the UE 102. The UE 102 processes the SIP 200 OK message at label 168 and in response initiates the IMS call at label 170.

Turning now to FIG. 3, a method 200 is described. In an embodiment, method 200 is a method of authorizing an IP multimedia system (IMS) call in a foreign country for a wireless communication device that has a wireless communication subscription service with a United States (US) wireless communication service provider. At block 201, the method 200 comprises receiving a command message by a first home subscriber server (HSS) database maintained by the US wireless communication service provider, wherein the command message identifies an update to an allow list of the first HSS database. In an embodiment, the command message may be generated and transmitted by a craftsperson entering a single command using a workstation, for example using the workstation 138 of FIG. 1. At block 202, the method 200 comprises, in response to receiving the command message, updating the allow list in a first HSS database, wherein the allow list identifies countries in which the US wireless communication service provider allows subscribers to receive international IMS roaming service.

At block 204, the method 200 comprises automatically replicating the update of the allow list in the first HSS database to an allow list in each of a plurality of other HSS databases maintained by the US wireless communication service provider, wherein the command message received by the first HSS database causes the update of allow lists in the first HSS database and in the plurality of other HSS databases maintained by the US wireless communication service provider. In an embodiment, the first HSS database and the other HSS databases are part of a centralized node architecture. In an embodiment, the single command generated by the craftsperson using the workstation may cause the updating of the allow lists of the first HSS database and the plurality of other HSS databases maintained by the US wireless communication service provider. This is contrast to a system that would otherwise require the craftsperson to update each of a plurality of CSCFs (e.g., CSCFs 110 of FIG. 1) to update the function of allowing or disallowing international IMS roaming.

At block 206, the method 200 comprises receiving a first request for authorization to originate a first IMS call by an HSS located in the US, wherein the request is received from a first wireless communication device located outside of the US and the first request identifies a first country where the first wireless communication device is located. In an embodiment, the first wireless communication device is one of a smart phone, a mobile phone, a laptop computer, a tablet computer, or a notebook computer. In an embodiment, the first IMS call is one of a voice call, a text message, and a video call.

At block 208, the method 200 comprises determining by the HSS that international IMS roaming service is allowed by the wireless communication service provider in the first country by looking up the first country in an allow list in a second HSS database, wherein the second HSS database is one of the other HSS databases maintained by the US wireless communication service provider. At block 210, the method 200 comprises determining by the HSS that a first wireless communication subscription service associated with the first wireless communication device allows international IMS roaming service. At block 212, the method 200 comprises sending an authorization to originate the first IMS call by the HSS to the first wireless communication device, whereby the first wireless communication device is enabled to originate the first IMS call in the first country.

In an embodiment, a call session control function (CSCF) sends the request for authorization to originate the first IMS call to the HSS, the CSCF receives the authorization to originate the first IMS call from the HSS, and the CSCF sends the authorization to originate the first IMS call to the first wireless communication device. In an embodiment, the CSCF sends the authorization to originate the first IMS call to the first wireless communication device in the form of a session initiation protocol (SIP) 200 OK message. In an embodiment, the method 200 further comprises receiving a second request for authorization to originate a second IMS call by the HSS, wherein the second request is received from a second wireless communication device located outside of the US and the request identifies the first country where the second wireless communication device is located; determining by the HSS that a second wireless communication subscription service associated with the second wireless communication device does not allow international IMS roaming service; and sending a request denied message by the HSS to the second wireless communication device. In an embodiment, the US wireless communication service provider operates a plurality of CSCFs and the updates of the allow lists in the first HSS database and the plurality of other HSS databases in response to the command message received by the first HSS database obviates updating each of the plurality of CSCFs one-at-a-time by a craftsperson.

Turning now to FIG. 4, a method 220 is described. In an embodiment, the method 220 is a method of authorizing an IP multimedia system (IMS) call in a foreign country for a wireless communication device that has a wireless communication subscription service with a United States (US) wireless communication service provider. At block 222, the method 220 comprises receiving a request for authorization to originate a first IMS call by a home subscriber server (HSS) located in the US, wherein the request is received from a first wireless communication device located outside of the US and the request identifies a first country where the first wireless communication device is located. In an embodiment, the first wireless communication device is one of a smart phone, a mobile phone, a laptop computer, a tablet computer, or a notebook computer.

At block 224, the method 220 comprises determining by the HSS that international IMS roaming service is allowed by the wireless communication service provider in the first country. At block 226, the method 220 comprises determining by the HSS that a first wireless communication subscription service associated with the first wireless communication device allows international IMS roaming service. At block 228, the method 220 comprises sending an authorization to originate the first IMS call by the HSS to the first wireless communication device, whereby the first wireless communication device is enabled to originate the first IMS call in the first country. In an embodiment, the first IMS call is one of a voice call, a SMS text, or a video call.

In an embodiment, the HSS sends the authorization to originate the first IMS call to a call session control function (CSCF). In an embodiment, the authorization to originate the first IMS call is sent in the form of a user authentication answer (UAA) 2001 diameter protocol message to the CSCF. In an embodiment, the HSS receives the request for authorization to originate the first IMS call in the form of a user authorization request (UAR) diameter protocol message from the CSCF. In an embodiment, the CSCF sends the authorization to originate the first IMS call to the first wireless communication device in the form of a session initiation protocol (SIP) 200 OK message. In an embodiment, the method 220 further comprises receiving a request for authorization to originate a second IMS call by the HSS, wherein the request is received from a second wireless communication device located outside of the US and the request identifies the first country where the second wireless communication device is located; determining by the HSS that international IMS roaming service is allowed by the wireless communication service provider in the first country; determining by the HSS that a second wireless communication subscription service associated with the second wireless communication device does not allow international IMS roaming service; sending an authorization denied message in the form of a UAA 5004 diameter protocol message by the HSS to the CSCF; and sending an authorization denied message in the form of a SIP 403 message to the second wireless communication device.

Turning now to FIG. 5, a method 240 is described. In an embodiment, the method 240 is a method of authorizing an IP multimedia system (IMS) call in a foreign country for a wireless communication device that has a wireless communication subscription service with a United States (US) wireless communication service provider. At block 242, the method 240 comprises updating an allow list in a first home subscriber server (HSS) database maintained by the US wireless communication service provider, wherein the allow list identifies countries in which the US wireless communication service provider allows subscribers to receive international IMS roaming service including a first country that is outside of the US.

At block 244, the method 240 comprises automatically replicating the update of the allow list in the first HSS database to a plurality of other HSS databases maintained by the US wireless communication service provider. At block 246, the method 240 comprises receiving a request for authorization to originate a first IMS call by an HSS located in the US, wherein the request is received from a first wireless communication device and the request identifies the first country. In an embodiment, the first wireless communication device is one of a smart phone, a mobile phone, a laptop computer, a tablet computer, or a notebook computer.

At block 248, the method 240 comprises determining by the HSS that international IMS roaming service is allowed by the wireless communication service provider in the first country by looking up the first country in an allow list in a second HSS database, wherein the second HSS database is one of the other HSS databases maintained by the US wireless communication service provider. At block 250, the method 240 comprises sending an authorization to originate the first IMS call by the HSS to the first wireless communication device, whereby the first wireless communication device is enabled to originate the first IMS call in the first country. In an embodiment, the first IMS call is one of a voice call, a SMS text, or a video call.

In an embodiment, the HSS sends the authorization to originate the first IMS call in the form of a user authentication answer (UAA) 2001 diameter protocol message to a call session control function (CSCF), and the CSCF sends the authorization to originate the first IMS call to the first wireless communication device in the form of a session initiation protocol (SIP) 200 OK message. In an embodiment, the HSS receives the request for authorization to originate the first IMS call in the form of a user authorization request (UAR) diameter protocol message from the CSCF.

Figure 6:
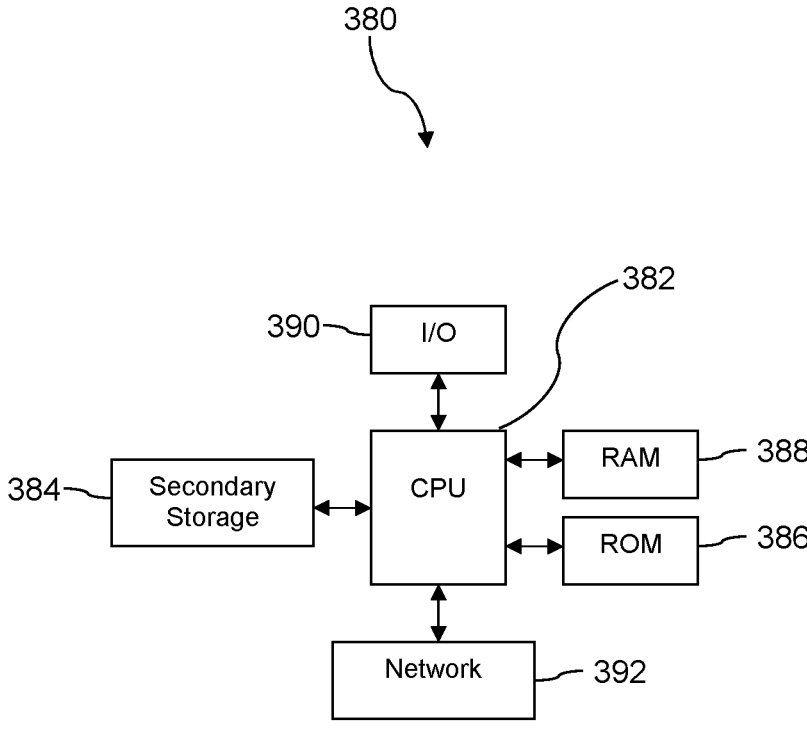
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392.

While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other nonvolatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of authorizing an IP multimedia system (IMS) call in a foreign country for a wireless communication device that has a wireless communication subscription service with a United States (US) wireless communication service provider, comprising:

receiving a command message by a first home subscriber server (HSS) database maintained by the US wireless communication service provider, wherein the command message identifies an update to an allow list of the first HSS database;

in response to receiving the command message, updating the allow list in a first HSS database, wherein the allow list identifies countries in which the US wireless communication service provider allows subscribers to receive international IMS roaming service;

automatically replicating the update of the allow list in the first HSS database to an allow list in each of a plurality of other HSS databases maintained by the US wireless communication service provider, wherein the command message received by the first HSS database causes the update of allow lists in the first HSS database and in the plurality of other HSS databases maintained by the US wireless communication service provider;

receiving a first request for authorization to originate a first IMS call by an HSS located in the US, wherein the first request is received from a first wireless communication device located outside of the US and the request identifies a first country where the first wireless communication device is located;

determining by the HSS that international IMS roaming service is allowed by the wireless communication service provider in the first country by looking up the first country in an allow list in a second HSS database, wherein the second HSS database is one of the other HSS databases maintained by the US wireless communication service provider;

determining by the HSS that a first wireless communication subscription service associated with the first wireless communication device allows international IMS roaming service; and sending an authorization to originate the first IMS call by the HSS to the first wireless communication device, whereby the first wireless communication device is enabled to originate the first IMS call in the first country.

2. The method of claim 1, wherein the first HSS database and the other HSS databases are part of a centralized node architecture.

3. The method of claim 1, wherein the first wireless communication device is one of a smart phone, a mobile phone, a laptop computer, a tablet computer, or a notebook computer.

4. The method of claim 1, wherein the first IMS call is one of a voice call, a text message, and a video call.

5. The method of claim 1, wherein a call session control function (CSCF) sends the request for authorization to originate the first IMS call to the HSS, the CSCF receives the authorization to originate the first IMS call from the HSS, and the CSCF sends the authorization to originate the first IMS call to the first wireless communication device.

6. The method of claim 5, wherein the US wireless communication service provider operates a plurality of CSCFs and the updates of the allow lists in the first HSS database and the plurality of other HSS databases in response to the command message received by the first HSS database obviates updating each of the plurality of CSCFs one-at-a-time by a craftsperson.

7. The method of claim 1, further comprising receiving a second request for authorization to originate a second IMS call by the HSS, wherein the second request is received from a second wireless communication device located outside of the US and the request identifies the first country where the second wireless communication device is located;

determining by the HSS that a second wireless communication subscription service associated with the second wireless communication device does not allow international IMS roaming service; and sending a request denied message by the HSS to the second wireless communication device.

8. A method of authorizing an IP multimedia system (IMS) call in a foreign country for a wireless communication device that has a wireless communication subscription service with a United States (US) wireless communication service provider, comprising:

updating an allow list in a first home subscriber server (HSS) database of a plurality of HSS databases maintained by the US wireless communication service provider, wherein the allow list identifies countries in which the US wireless communication service provider allows subscribers to receive international IMS roaming service including a first country that is outside of the US;

automatically replicating the update of the allow list in the first HSS database to other HSS databases of the plurality of HSS databases maintained by the US wireless communication service provider;

receiving a request for authorization to originate a first IMS call by an HSS located in the US, wherein the request is received from a first wireless communication device located outside of the US and the request identifies a first country where the first wireless communication device is located;

determining by the HSS that international IMS roaming service is allowed by the wireless communication service provider in the first country by looking up the first country in an allow list in one of the other HSS databases;

determining by the HSS that a first wireless communication subscription service associated with the first wireless communication device allows international IMS roaming service; and sending an authorization to originate the first IMS call by the HSS to the first wireless communication device, whereby the first wireless communication device is enabled to originate the first IMS call in the first country.

9. The method of claim 8, wherein the first wireless communication device is one of a smart phone, a mobile phone, a laptop computer, a tablet computer, or a notebook computer.

10. The method of claim 8, wherein the HSS sends the authorization to originate the first IMS call to a call session control function (CSCF).

11. The method of claim 10, wherein the authorization to originate the first IMS call is sent in the form of a user authentication answer (UAA) 2001 diameter protocol message to the CSCF.

12. The method of claim 10, wherein the HSS receives the request for authorization to originate the first IMS call in the form of a user authorization request (UAR) diameter protocol message from the CSCF.

13. The method of claim 10, wherein the CSCF sends the authorization to originate the first IMS call to the first wireless communication device in the form of a session initiation protocol (SIP) 200 OK message.

14. The method of claim 10, further comprising:

receiving a request for authorization to originate a second IMS call by the HSS, wherein the request is received from a second wireless communication device located outside of the US and the request identifies the first country where the second wireless communication device is located;

determining by the HSS that international IMS roaming service is allowed by the wireless communication service provider in the first country;

determining by the HSS that a second wireless communication subscription service associated with the second wireless communication device does not allow international IMS roaming service;

sending an authorization denied message in the form of a UAA 5004 diameter protocol message by the HSS to the CSCF; and sending an authorization denied message in the form of a SIP 403 message to the second wireless communication device.

15. The method of claim 8, wherein the first IMS call is one of a voice call, a SMS text, or a video call.

16. A method of authorizing an IP multimedia system (IMS) call in a foreign country for a wireless communication device that has a wireless communication subscription service with a United States (US) wireless communication service provider, comprising:

updating an allow list in a first home subscriber server (HSS) database maintained by the US wireless communication service provider, wherein the allow list identifies countries in which the US wireless communication service provider allows subscribers to receive international IMS roaming service including a first country that is outside of the US;

automatically replicating the update of the allow list in the first HSS database to a plurality of other HSS databases maintained by the US wireless communication service provider;

receiving a request for authorization to originate a first IMS call by an HSS located in the US, wherein the request is received from a first wireless communication device and the request identifies the first country;

determining by the HSS that international IMS roaming service is allowed by the wireless communication service provider in the first country by looking up the first country in an allow list in a second HSS database, wherein the second HSS database is one of the other HSS databases maintained by the US wireless communication service provider; and sending an authorization to originate the first IMS call by the HSS to the first wireless communication device, whereby the first wireless communication device is enabled to originate the first IMS call in the first country.

17. The method of claim 16, wherein the first IMS call is one of a voice call, a SMS text, or a video call.

18. The method of claim 16, wherein the first wireless communication device is one of a smart phone, a mobile phone, a laptop computer, a tablet computer, or a notebook computer.

19. The method of claim 16, wherein the HSS sends the authorization to originate the first IMS call in the form of a user authentication answer (UAA) 2001 diameter protocol message to a call session control function (CSCF), and the CSCF sends the authorization to originate the first IMS call to the first wireless communication device in the form of a session initiation protocol (SIP) 200 OK message.

20. The method of claim 19, wherein the HSS receives the request for authorization to originate the first IMS call in the form of a user authorization request (UAR) diameter protocol message from the CSCF.

* * * * *